United States Patent
Dhanapal et al.

(10) Patent No.: US 10,536,884 B2
(45) Date of Patent: Jan. 14, 2020

(54) CONNECTED MODE PRUNING ENHANCEMENTS

(71) Applicant: QUALCOMM Incorporated, San Diego, CA (US)

(72) Inventors: Muthukumaran Dhanapal, Sunnyvale, CA (US); Srinivasan Balasubramanian, San Diego, CA (US); Shravan Kumar Raghunathan, San Diego, CA (US); Parthasarathy Krishnamoorthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 15/719,826

(22) Filed: Sep. 29, 2017

(65) Prior Publication Data
US 2019/0104453 A1 Apr. 4, 2019

(51) Int. Cl.
*H04W 36/00* (2009.01)
*H04W 24/08* (2009.01)

(52) U.S. Cl.
CPC ....... *H04W 36/0094* (2013.01); *H04W 24/08* (2013.01); *H04W 36/0061* (2013.01); *H04W 36/00835* (2018.08); *H04W 36/0085* (2018.08)

(58) Field of Classification Search
CPC ............. H04W 36/0094; H04W 24/08; H04W 36/0061
See application file for complete search history.

(56) References Cited

U.S. PATENT DOCUMENTS

| | | |
|---|---|---|
| 9,432,922 B1 | 8/2016 | Song et al. |
| 2008/0318576 A1* | 12/2008 | So .................... H04W 36/0066 455/436 |
| 2009/0047958 A1* | 2/2009 | Rimhagen ............ H04J 11/0093 455/436 |
| 2013/0115952 A1* | 5/2013 | Wei .................... H04W 36/0088 455/436 |
| 2015/0119043 A1* | 4/2015 | Gopal ............... H04W 36/0061 455/437 |
| 2015/0146694 A1 | 5/2015 | Gopal et al. |
| 2015/0195757 A1* | 7/2015 | Tietz ................. H04W 36/0061 455/438 |
| 2015/0230157 A1 | 8/2015 | Rattner et al. |
| 2016/0262030 A1 | 9/2016 | Dhanapal et al. |

OTHER PUBLICATIONS

Ma X., et al., "Improving Geographical Routing for Wireless Networks with an Efficient Path Pruning Algorithm", IEEE Communications Society on Sensor and Ad Hoc Communications and Networks, 2006, 10 Pages.

* cited by examiner

*Primary Examiner* — Steven H Nguyen
(74) *Attorney, Agent, or Firm* — Patterson & Sheridan, L.L.P.

(57) ABSTRACT

Certain aspects of the present disclosure provide techniques for supporting a connected mode enhanced pruning procedure. A UE may select, while operating in connected mode with a first radio access technology (RAT), measurement candidates for a potential handover based on one or more criteria, maintain an active list including the selected measurement candidates, perform at least one measurement based, at least in part, on the active list, and take one or more actions based, at least in part, on the at least one measurement.

27 Claims, 7 Drawing Sheets

CONNECTED MODE PRUNING ENHANCEMENTS

INTRODUCTION

Aspects of the present disclosure relate to wireless communication and, more particularly, connected mode pruning enhancements performed by a user equipment.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for connected mode pruning enhancements.

Certain aspects of the present disclosure provide a method for wireless communication that may be performed, for example, by a UE. The method includes selecting, while operating in connected mode with a first radio access technology (RAT), measurement candidates for a potential handover based on one or more criteria, maintaining an active list including the selected measurement candidates, performing at least one measurement based, at least in part, on the active list, and taking one or more actions based, at least in part, on the at least one measurement.

Certain aspects of the present disclosure provide an apparatus for wireless communication that may be performed, for example, by a UE. The apparatus includes means for selecting, while operating in connected mode with a first radio access technology (RAT), measurement candidates for a potential handover based on one or more criteria, means for maintaining an active list including the selected measurement candidates, means for performing at least one measurement based, at least in part, on the active list, and means for taking one or more actions based, at least in part, on the at least one measurement.

Certain aspects of the present disclosure provide an apparatus for wireless communication that may be performed, for example, by a UE. The apparatus includes at least one processor and a memory coupled to the at least one processor. The at least one processor is configured to select, while operating in connected mode with a first radio access technology (RAT), measurement candidates for a potential handover based on one or more criteria, maintain an active list including the selected measurement candidates, perform at least one measurement based, at least in part, on the active list, and take one or more actions based, at least in part, on the at least one measurement.

Certain aspects of the present disclosure provide a computer readable medium for wireless communication by a UE having computer-executable instructions stored thereon for selecting, while operating in connected mode with a first radio access technology (RAT), measurement candidates for a potential handover based on one or more criteria, maintaining an active list including the selected measurement candidates, performing at least one measurement based, at least in part, on the active list, and taking one or more actions based, at least in part, on the at least one measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

A UE may perform connected mode pruning in an effort to determine if it should be handed over from a serving BS to an inter-frequency carrier (intra-RAT carrier) or an inter-RAT neighbor. Because a UE may not be able to measure a signal strength (e.g., reference signal receive power (RSRP), reference signal receive quality (RSRQ), or received signal strength indicator (RSSI)) associated with every inter-frequency or inter-RAT neighbor, the UE may prune or limit the number measurement candidates. Aspects of the present disclosure provide techniques and apparatus for supporting enhanced connected mode pruning by a UE.

Currently, a network may transmit a radio resource control (RRC) reconfiguration message over the air (OTA). The RRC reconfiguration message may include one or more inter-frequency or one or more inter-RAT neighbors for which the UE may perform connected mode measurements. As will be described in more detail herein, currently, UEs may not intelligently determine which of the inter-frequency or inter-RAT neighbors on which to perform measurements. The UE may blindly select inter-frequencies or inter-RAT neighbors for performing measurements. Thus, the UE may prune out (e.g., not select and, therefore, not measure) certain potentially, strong frequencies or neighbor cells. Accordingly, the UE may miss possible handovers opportunities. This may lead to dropped calls and a poor user experience. Aspects of the present disclosure provide methods and apparatus for enhancing the pruning techniques used by a UE, in an effort to avoid (1) pruning out strong candidate frequencies or cells and (2) missing handover opportunities.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

Aspects of the present disclosure provide apparatus, methods, processing systems, and computer readable mediums that may operate in a new radio (NR) (new radio access technology or 5G technology) environment. NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

Figure 1:
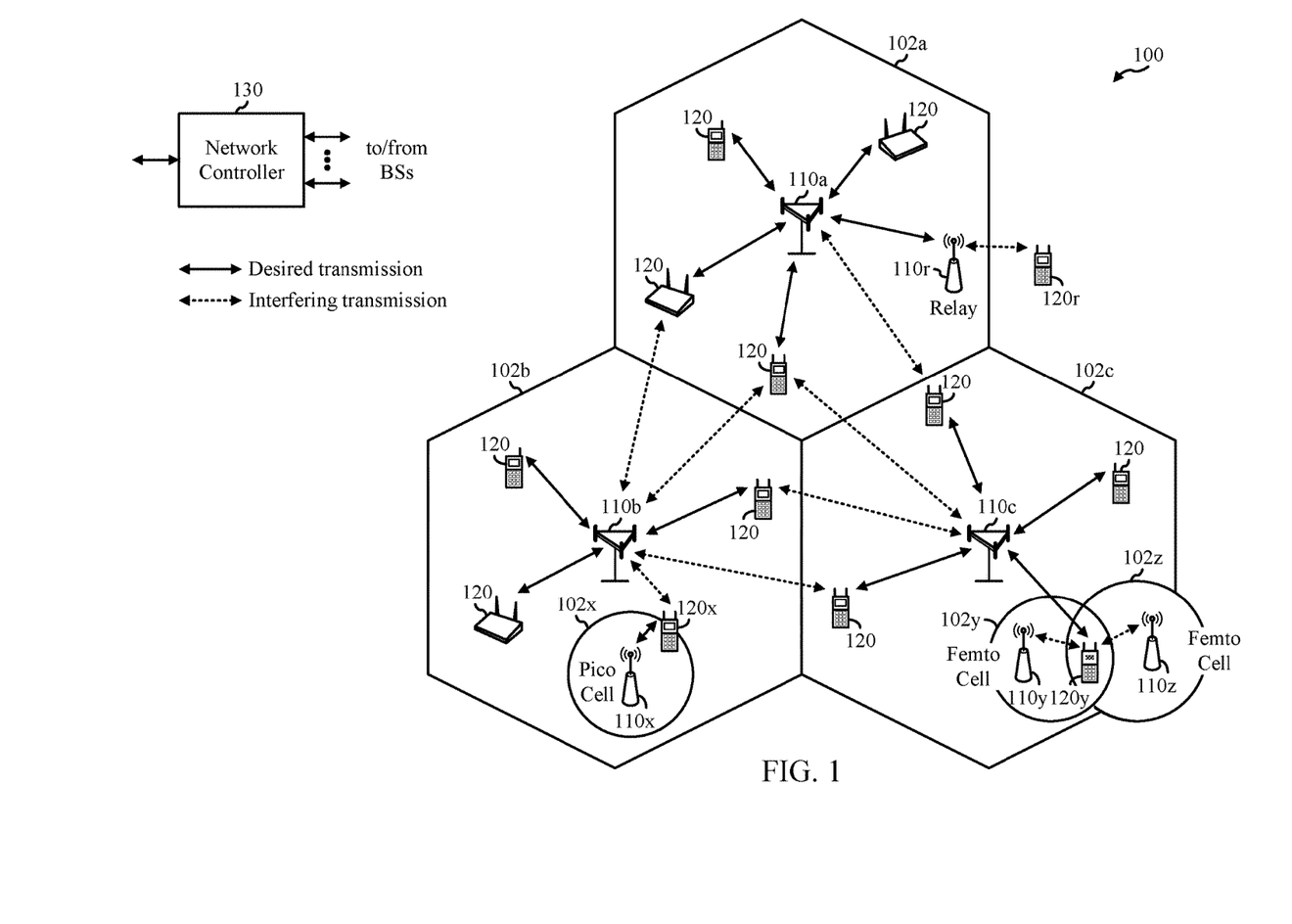
FIG. 1 is a block diagram conceptually illustrating an example telecommunications system, in accordance with certain aspects of the present disclosure.

FIG. 1 illustrates an example wireless network 100 in which aspects of the present disclosure may be implemented. For example, the wireless network may be a new radio (NR) or 5G network. The wireless network may be an LTE network, or any other 3G, 4G, or emerging network.

Figure 8:
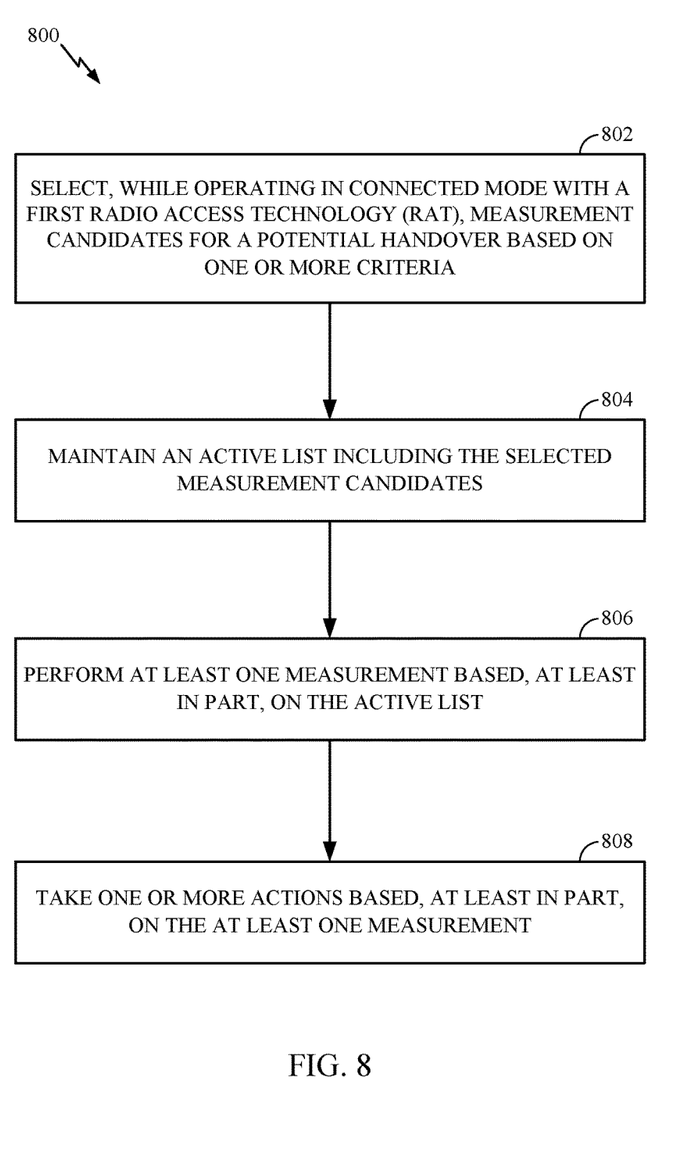
FIG. 8 illustrates an example operations performed by a UE, in accordance with certain aspects of the present disclosure.

As will be described in more detail herein, a UE perform enhanced connected mode pruning techniques in an effort to efficiently identify handover opportunities. The UE may maintain an active list of measurement candidates. The measurement candidates may include inter-frequency (e.g., LTE inter-frequency wherein there a change in the UE's center frequency) and/or inter-RAT neighbors. The active list may be updated by the UE based, at least in part, on measurements taken by the UE. As an example, the UE may remove measurement candidate from an active measurement list after performing and reporting measurements associated with the candidate frequency. UEs 120 may be configured to perform the operations 800 and other methods described herein and discussed in more detail below for connected mode pruning enhancements. The UE 120 may be an eMTC UE.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a wearable device such as a smart watch, smart clothing, virtual reality goggles, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a positioning system (e.g., GPS, GLONASS, Galileo, Beidou, terrestrial-based) device, or any other suitable device that is configured to communicate via a wireless or wired medium. Some UEs may be considered machine-type communication (MTC) devices or enhanced/evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. IoT may refer to a network of physical objects, devices, or "things". IoT devices may be embedded with, for example, electronics, software, or sensors and may have network connectivity, which enable these devices to collect and exchange data. IoT devices may include, for example, MTC/eMTC devices and narrowband IoT (NB-IoT) devices, and the techniques described herein may be applicable to IoT devices, low cost devices, low power devices, as well as other types of devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
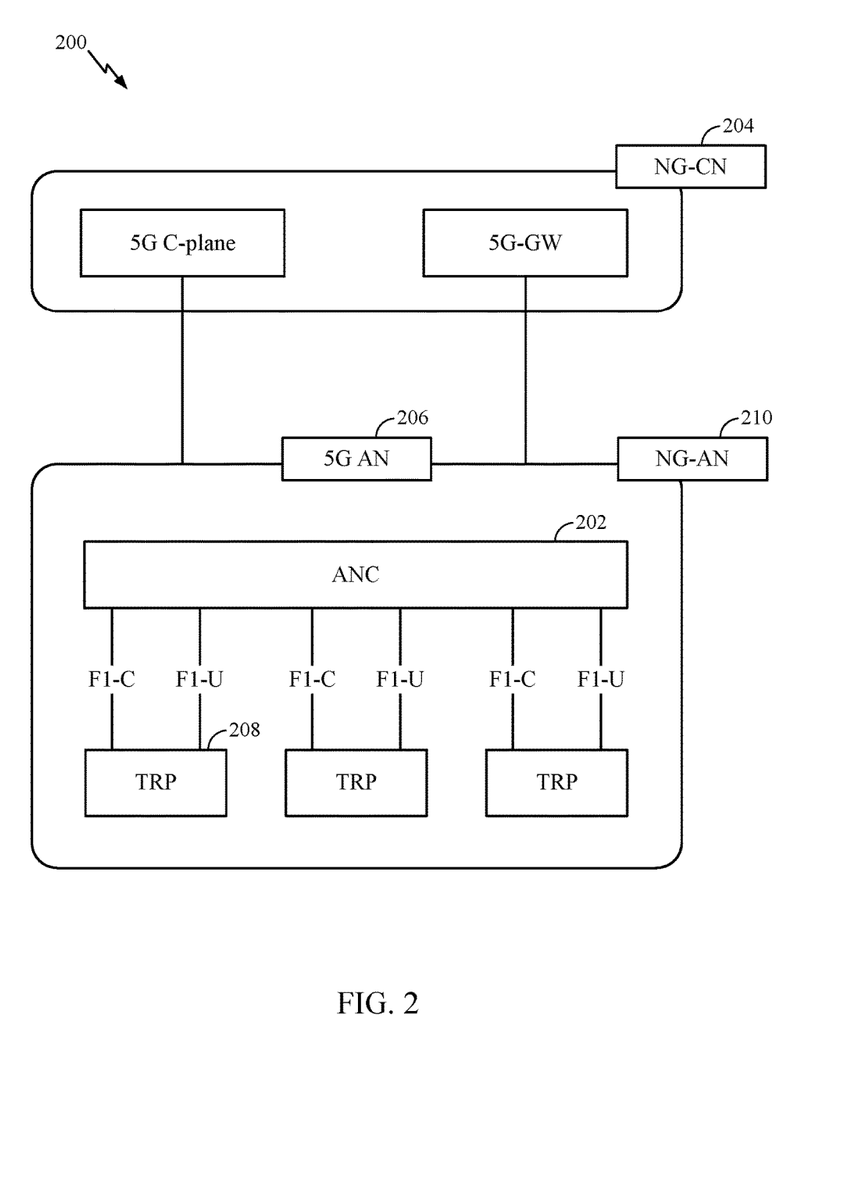
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
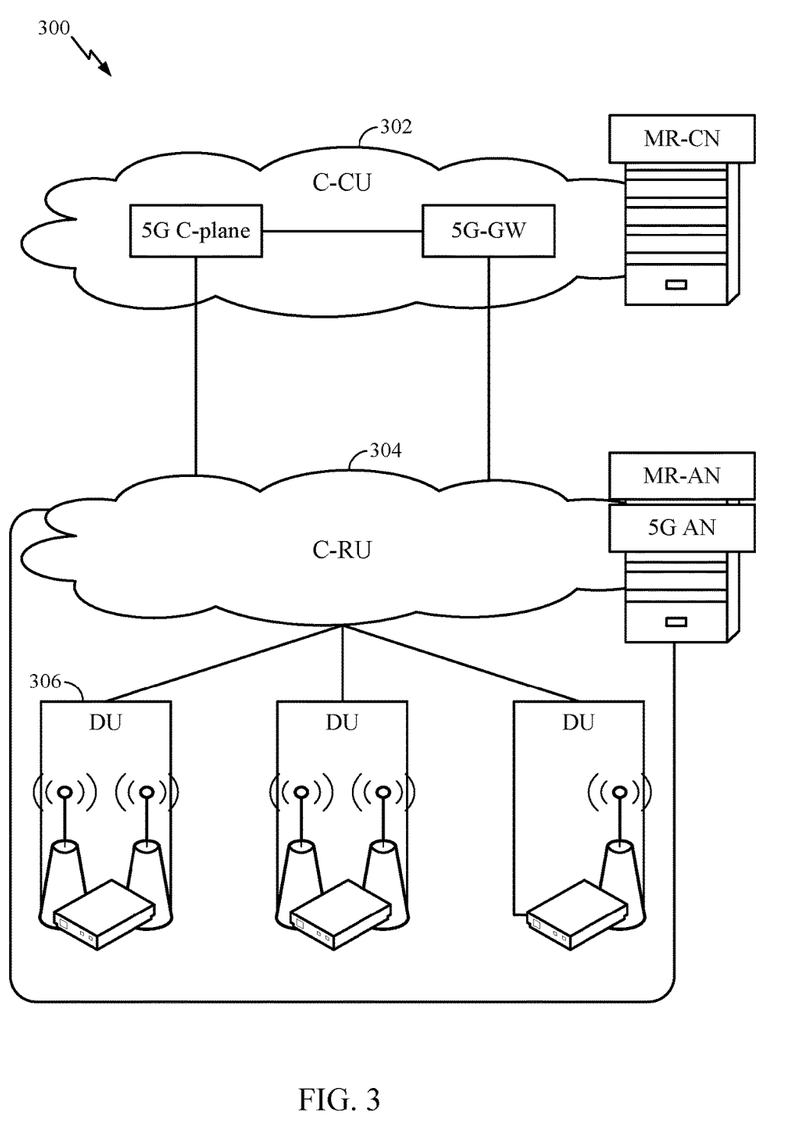
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
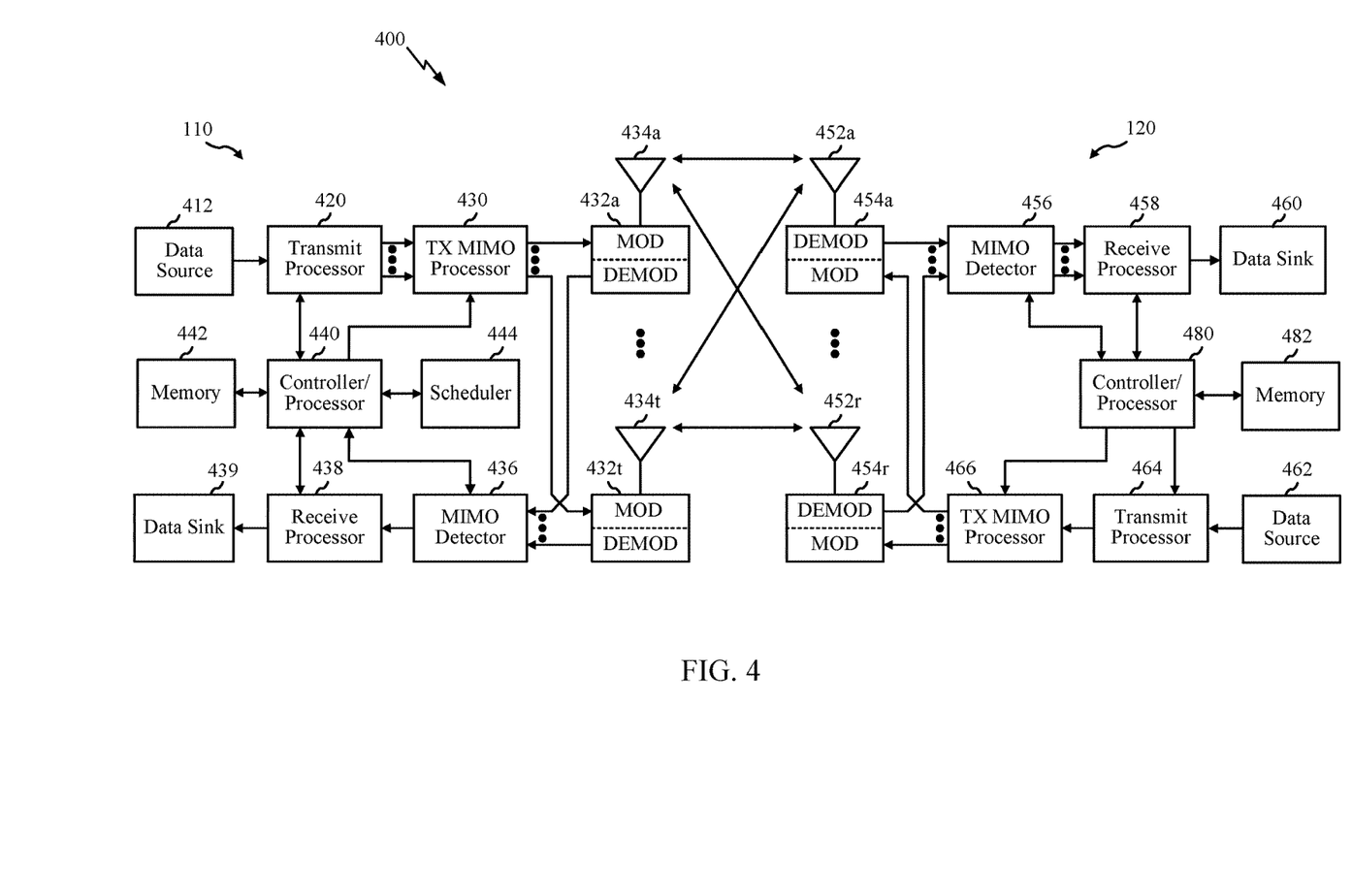
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or a gNB. One or more components of the UE 120 may be used to practice aspects of the present disclosure. For example, antennas 452, mod./demod. 454, processors 458, 464, 466, and/or controller/processor 480 of the UE 120 may be configured to perform the operations described herein and illustrated in FIG. 8.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. For example, the processor 480 and/or other processors and modules at the UE 120 may perform or direct, e.g., the execution of the functional blocks illustrated in FIG. 8, and/or other processes for the techniques described herein and those illustrated in the appended drawings. The memories 442 and 482 may store data and program codes for the BS 110 and the UE 120, respectively. A scheduler 444 may schedule UEs for data transmission on the downlink and/or uplink.

Figure 5:
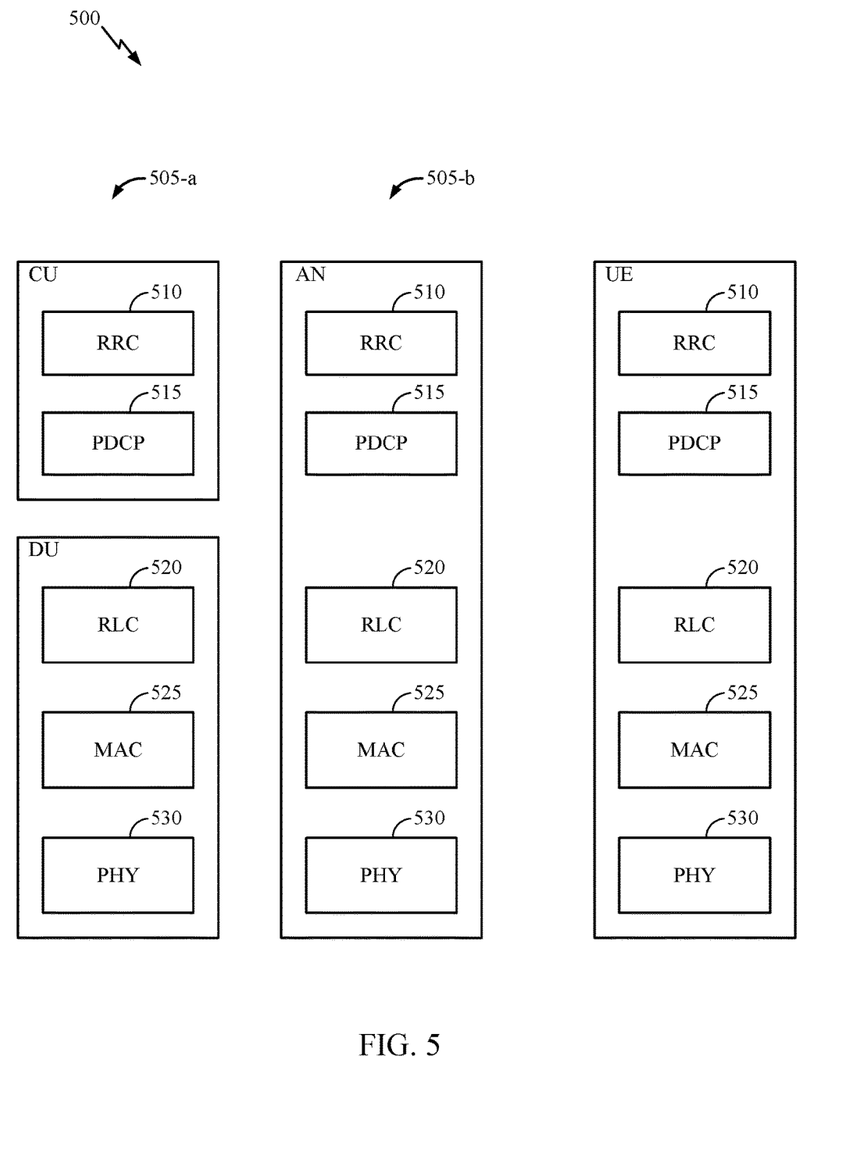
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
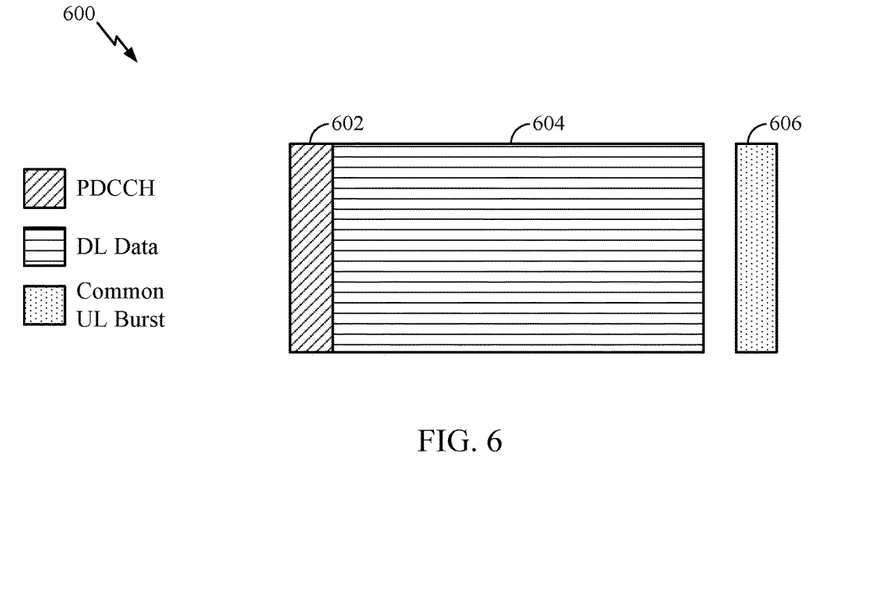
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
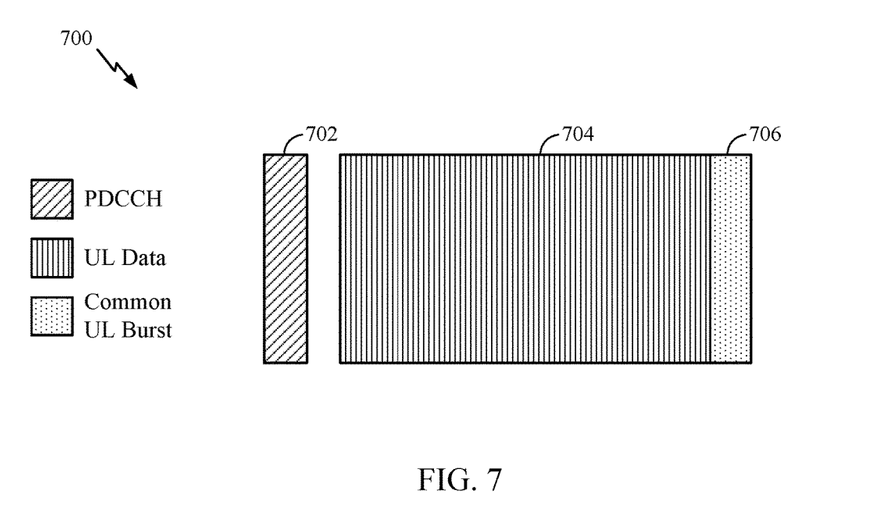
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Carrier Aggregation

In some cases, UEs may use spectrum of up to 20 MHz bandwidths allocated in a carrier aggregation of up to a total of 100 MHz (5 component carriers) used for transmission in each direction. For certain mobile systems (e.g., LTE-Advanced), two types of carrier aggregation (CA) methods have been proposed, continuous CA and non-continuous CA. Continuous CA occurs when multiple available component carriers are adjacent to each other. On the other hand, non-continuous CA occurs when multiple available component carriers are separated along the frequency band. Both non-continuous and continuous CA aggregates multiple component carriers to serve a single UE.

The RRC connection is handled by one cell, the Primary serving cell (Pcell), served by the Primary component carrier (DL and UL PCC). It is also on the DL PCC that the UE receives NAS information, such as security parameters. In idle mode the UE listens to system information on the DL PCC. On the UL PCC PUCCH is transmitted. The other component carriers are all referred to as Secondary component carriers (DL and UL SCC), serving the Secondary serving cells (Scell). The SCCs are added and removed as required, while the PCC is only changed at handover.

It should be noted that while the preceding specifically refers to CA for LTE-Advanced UEs, the same general concept of CA applies to other types of UEs and base stations (e.g., BSs/UEs configured to operate in a new radio (NR) system according to a 5G specification), for example as explained in greater detail below.

Example Connected Mode Pruning Enhancements

A connected mode UE may have a RRC connection (e.g., e-UTRAN-RRC) with a serving BS. The network (e.g., BS) and the UE may transmit and receive data. The connected mode UE may know its location at a cell level and the network may manage the UE's mobility by way of handover.

The network may transmit RRC reconfiguration messages OTA. These messages may contain a number of inter-frequency (e.g., LTE inter-frequency) and inter-RAT neighbors for connected mode UE's to measure. Currently, a UE may blindly select certain frequencies and inter-RAT neighbors from the RRC message for performing connected mode measurements. These measurements may be compared to measurements associated with a serving BS. Based, at least in part, on the comparison and other factors, such as load balancing, the BS may determine whether or not to handover the UE to a target BS.

Currently, the UE may select a starting measurement candidate based on a received measurement object or a measurement database at the UE. The UE may prune out potentially strong measurement candidates. Accordingly, (1) measurement reports (MRs) transmitted by the UE associated with the measured frequencies and/or RATs may not include measurements of the pruned-out candidates or (2) the UE may transmit a delayed MR when measurements of stronger frequencies or cells are not prioritized. Therefore, the UE may miss out on handover opportunities or experience an increased call drop rate.

This issue may be exacerbated in, for example, eMTC devices. eMTC UEs may include low-power devices. An eMTC device that performs measurements on multiple neighbor cells or frequencies without prioritizing frequencies and/or cells may not transmit an early MR. This consumes unnecessary battery power and may lead to handover failure. The lack of prioritization may also waste network resources because the eMTC UE may transmit one or more MRs associated with weaker cells instead of or before MRs associated with stronger cells.

Accordingly, aspects of the present disclosure provide methods and apparatus for a connected mode pruning algorithm in which a UE intelligently selects measurement candidates. As described herein, the UE may maintain an active list of measurement candidates. The UE may modify or update the active list in effort to adaptively and intelligently determine the frequencies and RATs on which to perform measurements. As a result of the enhanced pruning mechanism, the UE may experience improved call and battery performance.

FIG. 8 illustrates example operations 800 which may be performed by a user equipment (UE) 120. The UE 120 may have one or more components as illustrated in FIG. 4. As an example, one or more of the antenna 452, demodulator/modulator 454, processors 458, 466, 464, controller/processor 480, and memory 482 may be configured to perform the operations described herein. The UE may be operating in a connected mode with a BS 110 of a first RAT. As an example, the UE may operate in a connected mode with a LTE BS.

According to aspects, a UE may perform connected mode pruning enhancements in response to receiving an RRC reconfiguration message. The RRC reconfiguration message may be an OTA message and may include multiple inter-frequency (e.g., LTE inter-frequency) or inter-RAT neighbors on which the UE may perform measurements. Thus, the network may provide an indication of multiple frequencies and/or neighboring RATs. The UE may prioritize measurements as described herein.

Certain wireless communication standards may specify a number of cells or frequencies a UE may measure during connected mode operation. As an example, a standard may specify the UE may measure up to 8 cells (e.g., 8 LTE cells). The UE may measure the serving cell and 7 neighboring cells to comply with the standard. The enhanced pruning mechanisms may be used to intelligently select the inter-frequency candidates, in compliance with an applicable standard. Additionally, the enhanced pruning mechanism may be used to select inter-RAT neighbors on which to perform measurements.

At 802, the UE may select measurement candidates for a potential handover based on one or more criteria. The measurement candidates may include one or more inter-frequency and/or one or more inter-RAT neighbors. The criteria may include selecting a number of measurement candidates until a pruning limit is reached. The pruning limit may be specified by a wireless communication standard and/or by the capability of the UE. As an example of setting the pruning limit based on a capability of the UE, the pruning limit may be associated with a lower layer of the UE. Inter-frequency candidates or inter-RAT neighbors may be selected based on a received measurement object ID in an RRC message, until the lower layer pruning limit is reached.

At 804, the UE may maintain an active list including the selected measurement candidates. The candidates for potential handover may include any combination of the inter-frequency and inter-RAT neighbors described below.

The frequency associated with the serving BS (e.g., LTE serving frequency) may be a measurement candidate. It may be important that the serving frequency is a selected measurement candidate in an effort for the network to compare measurements of other cells or frequencies and determine whether or not to hand over the UE to a target BS.

The UE may select a candidate frequency from an acquisition database, which may be stored in the UE. As an example, the UE may select, from a cache of recently seen networks which are included in an acquisition database, inter-frequencies neighbor(s) on which to perform measurements. The acquisition database may include the E-UTRA Absolute Radio Frequency Channel Numbers (EARFCNs) that the UE has recently seen or discovered. Additionally or alternatively, the UE may select a candidate frequency from information received in a System Information Block 5 (SIB5). SIB5 may include information relevant to or inter-frequency cell re-selection.

Additionally or alternatively, the UE may select, as a measurement candidate, an inter-frequency neighbor from a secondary cell (Scell) measurement database. The Scell database may include the most recently added Scell LTE frequencies.

Additionally or alternatively, the UE may select an inter-frequency neighbor that supports gapless measurements. In certain scenarios, a network may not schedule a UE with measurement gaps. Based on capability signaling from the UE to the network, the UE can indicate whether or not the UE needs measurement gaps to carry out measurements on a certain band/inter-frequency candidate. Stated otherwise, through gapless measurements, the UE can continue to receive data while performing measurements. Thus, the network may not configure the UE with measurement gaps for the band/inter-frequency candidate indicated by the UE as not needing measurement gaps. According to aspects, the UE may select, as a measurement candidate, one or more inter-frequency neighbors which support gapless measurements. In this manner, if the network does not schedule measurement gaps, the UE may still measure a potentially strong cell.

Additionally or alternatively, the UE may select a Global System for Mobile (GSM) neighbor, if any. The one or more GSM neighbors may be selected based on multiple received GSM measurement objects. The total number of GSM absolute radio-frequency channel numbers (ARFCNs) may be less than 32.

Additionally or alternatively, the UE may select at least one inter-RAT neighbor based, at least in part, on an inter-RAT acquisition database or information contained in a system information block (SIB). As an example, the UE may have one or more of a Wideband Code Division Multiplexing Access (WCDMA), Time Division Synchronous Code Division Multiple Access (TD-SCDMA), and/or Code-division multiple access (CDMA) acquisition database. The UE may select one or more WCDMA/TD-SCDMA/CDMA neighbors, if any, based on the respective acquisition database at the UE. The UE may select at least one of the inter-RAT neighbor based on a received SIB. Certain SIBs, such as SIB6 or SIB8 may transmit information to a UE associated with inter-RAT reselection. For example, the UE may select a WCDMA/TD-SCDMA/CDMA candidate for measurement based on information contained in a SIB6 or SIB8.

Additionally or alternatively, the UE may select inter-frequency or inter-RAT neighbors which are associated with special report configurations. This may include cells associated with Cell Global Identity (CGI) supporting gaps for measurements, CGI supporting gapless measurements, Self-Organizing Network (SON) reporting, or discovery signal measurements for licensed assisted access (LAA) using a LTE RAT. According to aspects, one or more of these selected measurement candidates may be removed from the active measurement list once an MR associated with the measurement is transmitted to the network.

Additionally or alternatively, the UE may select inter-frequency or inter-RAT neighbors which may be auto deleted (e.g., automatically removed from a measurement list) once a measurement criteria is satisfied. For example, the UE may pick LTE inter-frequency/inter-RAT neighbors which need to be reported 3 times (e.g., report amount set to 3) once a particular measurement criteria is met. After the measurement criteria is met, the UE removes the frequency or RAT from the active measurement list.

As described above, the UE may select a number of the inter-frequency or inter-RAT neighbors based on a measurement object ID until a lower layer pruning limit is reached.

By selecting any combination of the inter-frequency or inter-RAT neighbors described above, one or more measurement candidates may include one or more inter-frequency measurement candidates.

At 806, the UE may perform at least one measurement based, at least in part, on the active list. The UE may intelligently measure one or more of the measurement candidates on the active list. As an example, the UE may measure an RSRP, RSRQ, or RSSI associated with the candidate frequency or cell.

At 808, the UE may take one or more actions based, at least in part, on the at least one measurement. The UE may report the measurement to the serving BS. The serving BS may use the measurements to make a handover decision. Accordingly, the UE may transmit a MR to the BS serving the UE, wherein the MR is associated with a measurement candidate in the active list. The UE may also remove the measurement candidate from the active list. By managing the active list in the manner, the UE may select remaining measurement candidates until a lower layer pruning limit is reached.

According to aspects, once measurement reporting for neighbors from an inter-RAT acquisition database (WCDMA/TD-SCDMA/CDMA ACQ DB) or SIB6/SIB8 is complete, the UE may re-run the pruning algorithm. This is because after reporting measurements, these neighbors may be removed from the active measurement list. Thereafter, other frequency and neighbors may be added to the active measurement list.

According to aspects, certain frequencies may be part of a Normal Performance Group (NPG). The frequencies in the NPG may be prioritized for search and measurement. Examples of such prioritized frequencies include inter-frequency neighbors (from the UE's acquisition database), inter-frequency neighbors from a Scell database, and/or inter-frequency neighbors that support gapless measurements.

The enhanced mode pruning mechanisms described herein improve call performance and effectively identifying handover opportunities. Additionally, a UE's battery performance is enhanced as the UE intelligently determines the neighbors on which to perform measurements. The methods described herein may not require any additional hardware components. Existing components of the UE and software may be used to implement the pruning techniques. Finally, a UE may comply with the wireless communication standards and the enhancements described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

According to aspects, the described means, including, for example, the means for receiving, means for selecting, means for maintaining, means for performing, means for taking one or more actions, means for transmitting, means for removing, and means for prioritizing may be performed by one or more of antennas 452, mod/demod 454, processors 458, 464, 466, and/or controller/processor 480 of the UE 120.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, e.g., instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   selecting, while operating in connected mode with a first radio access technology (RAT), measurement candidates for a potential handover based on one or more criteria;
   maintaining an active list including the selected measurement candidates;
   performing at least one measurement based, at least in part, on the active list; and
   taking one or more actions based, at least in part, on the at least one measurement, wherein taking the one or more actions includes:
      transmitting a plurality of measurement reports (MRs), to a base station (BS) serving the UE, wherein every transmitted MR of the plurality of MRs is associated with a different measurement candidate of the selected measurement candidates in the active list; and
      removing each different measurement candidate from the active list in response to transmitting its associated MR.

2. The method of claim 1, wherein the measurement candidates include one or more inter-frequency or inter-RAT measurement candidates.

3. The method of claim 1, wherein selecting the measurement candidates comprises:
   selecting inter-RAT neighbors associated with at least one of a Cell Global Identity (CGI) having gaps, a CGI not having gaps, or signals associated with licensed assisted access (LAA) using a Long Term Evolution (LTE) RAT.

4. The method of claim 1, wherein taking the one or more actions comprises:
   selecting remaining measurement candidates for the active list based, at least in part, on a limit associated with a lower layer of the UE.

5. The method of claim 1, wherein selecting the measurement candidates comprises:
   prioritizing inter-frequency neighbors of the RAT.

6. The method of claim 5, wherein the inter-frequency neighbors comprise one or more of:
   inter-frequency neighbors from the UE's acquisition database, inter-frequency neighbors from the UE's secondary cell (Scell) database, or inter-frequency neighbors supporting gapless measurements.

7. The method of claim 1, wherein selecting the measurement candidates comprises:
   selecting one or more inter-frequency neighbors of the RAT from information contained in a system information block (SIB).

8. The method of claim 1, wherein selecting the measurement candidates comprises:
   selecting at least one inter-RAT neighbor based, at least in part, on an inter-RAT acquisition database or information contained in a system information block (SIB).

9. The method of claim 1, further comprising:
receiving, from a serving base station (BS), a radio resource control (RRC) reconfiguration message,
wherein the selecting is performed in response to the RRC configuration message.

10. An apparatus for wireless communication by a user equipment (UE), comprising:
at least one processor configured to:
select, while operating in connected mode with a first radio access technology (RAT), measurement candidates for a potential handover based on one or more criteria;
maintain an active list including the selected measurement candidates;
perform at least one measurement based, at least in part, on the active list; and
take one or more actions based, at least in part, on the at least one measurement, wherein taking the one or more actions includes:
transmitting a plurality of measurement reports (MRs), to a base station (BS) serving the UE, wherein every transmitted MR of the plurality of MRs is associated with a different measurement candidate of the selected measurement candidates in the active list; and
removing each different measurement candidate from the active list in response to transmitting its associated MR; and
a memory coupled to the at least one processor.

11. The apparatus of claim 10, wherein the measurement candidates include one or more inter-frequency or inter-RAT measurement candidates.

12. The apparatus of claim 10, wherein selecting the measurement candidates comprises:
selecting inter-RAT neighbors associated with at least one of a Cell Global Identity (CGI) having gaps, a CGI not having gaps, or signals associated with licensed assisted access (LAA) using a Long Term Evolution (LTE) RAT.

13. The apparatus of claim 10, wherein taking the one or more actions comprises:
selecting remaining measurement candidates for the active list based, at least in part, on a limit associated with a lower layer of the UE.

14. The apparatus of claim 10, wherein selecting the measurement candidates comprises:
prioritizing inter-frequency neighbors of the RAT.

15. The apparatus of claim 14, wherein the inter-frequency neighbors comprise one or more of:
inter-frequency neighbors from the UE's acquisition database, inter-frequency neighbors from the UE's secondary cell (Scell) database, or inter-frequency neighbors supporting gapless measurements.

16. The apparatus of claim 10, wherein selecting the measurement candidates comprises:
selecting one or more inter-frequency neighbors of the RAT from information contained in a system information block (SIB).

17. The apparatus of claim 10, wherein selecting the measurement candidates comprises:
selecting at least one inter-RAT neighbor based, at least in part, on an inter-RAT acquisition database or information contained in a system information block (SIB).

18. The apparatus of claim 10, further comprising:
receiving, from a serving base station (BS), a radio resource control (RRC) reconfiguration message,
wherein the selecting is performed in response to the RRC configuration message.

19. An apparatus for wireless communication by a user equipment (UE), comprising:
means for selecting, while operating in connected mode with a first radio access technology (RAT), measurement candidates for a potential handover based on one or more criteria;
means for maintaining an active list including the selected measurement candidates;
means for performing at least one measurement based, at least in part, on the active list; and
means for taking one or more actions based, at least in part, on the at least one measurement, wherein the means for taking one or more actions includes:
means for transmitting a plurality of measurement reports (MRs), to a base station (BS) serving the UE, wherein every transmitted MR of the plurality of MRs is associated with a different measurement candidate of the selected measurement candidates in the active list; and
means for removing each different measurement candidate from the active list in response to transmitting its associated MR.

20. The apparatus of claim 19, wherein the means for selecting the measurement candidates comprises:
means for selecting inter-RAT neighbors associated with at least one of a Cell Global Identity (CGI) having gaps, a CGI not having gaps, or signals associated with licensed assisted access (LAA) using a Long Term Evolution (LTE) RAT.

21. The apparatus of claim 19, wherein the means for taking the one or more actions comprises:
means for selecting remaining measurement candidates for the active list based, at least in part, on a limit associated with a lower layer of the UE.

22. The apparatus of claim 19, wherein the means for selecting the measurement candidates comprises:
means for prioritizing inter-frequency neighbors of the RAT.

23. The apparatus of claim 22, wherein the inter-frequency neighbors comprise one or more of:
inter-frequency neighbors from the UE's acquisition database, inter-frequency neighbors from the UE's secondary cell (Scell) database, or inter-frequency neighbors supporting gapless measurements.

24. The apparatus of claim 19, wherein the means for selecting measurement candidates comprises:
means for selecting one or more inter-frequency neighbors of the RAT from information contained in a system information block (SIB).

25. The apparatus of claim 19, wherein the means for selecting measurement candidates comprises:
means for selecting at least one inter-RAT neighbor based, at least in part, on an inter-RAT acquisition database or information contained in a system information block (SIB).

26. The apparatus of claim 19, further comprising:
means for receiving, from a serving base station (BS), a radio resource control (RRC) reconfiguration message,
wherein the means for selecting is performed in response to RRC configuration message.

27. A non-transitory computer readable medium for wireless communication by a user equipment (UE), comprising:
  instructions that, when executed by at least one processor, cause the at least one processor to:
  select, while operating in connected mode with a first radio access technology (RAT), measurement candidates for a potential handover based on one or more criteria;
  maintain an active list including the selected measurement candidates;
  perform at least one measurement based, at least in part, on the active list; and
  take one or more actions based, at least in part, on the at least one measurement, wherein taking the one or more actions includes:
    transmitting a plurality of measurement reports (MRs), to a base station (BS) serving the UE, wherein every transmitted MR of the plurality of MRs is associated with a different measurement candidate of the selected measurement candidates in the active list; and
    removing each different measurement candidate from the active list in response to transmitting its associated MR.

* * * * *